United States Patent Office 3,404,010
Patented Oct. 1, 1968

3,404,010
EDIBLE GELS
Calvin B. Wilds, 345 E. Taylor St.,
Reno, Nev. 89502
No Drawing. Continuation-in-part of applications Ser.
No. 76,445, Dec. 19, 1960, and Ser. No. 362,969,
Apr. 27, 1964. This application Dec. 9, 1966, Ser.
No. 600,383
1 Claim. (Cl. 99—131)

ABSTRACT OF THE DISCLOSURE

A multi-element gel comprising a mixture of furcellaria extract, potassium chloride, potassium citrate and citric acid. Sweeteners and flavoring agents may also be added if desired by the user.

---

This application is a continuation-in-part of my copending application, Ser. No. 76,445, filed on Dec. 19, 1960, and my copending application, Ser. No. 362,969, filed April 27, 1964.

The other applications have been abandoned except for the subject matter properly contained herein.

This invention relates to gels and more particularly to pure, edible, dessert type gels of vegetable origin.

While a number of different vegetable gels are on the market today, many difficulties are encountered with them and research people are continually attempting to correct these difficulties. In general these gels are not clear or transparent, but, instead are cloudy and opaque, particularly when colors or food dyes are used in the gel. There is a tendency, too, for such gels to "bleed" or "leak" excessively; that is, to be wet to the touch when the gels are handled. In some cases the strength of the gel is such that a molded gel will not maintain its shape. If it does maintain its shape, it is undesirable from an eating standpoint as a dessert because of the rigid stiffness of the mass. None of these gels have ever been satisfactory from the standpoint of the housewife as a dessert type gel due to the opaqueness, stiffness, non-resilience, and the tendency to fracture or "break" into small pieces when taken from the molds or after they are left to stand without molds.

Recognizing these problems, an object of this invention is to provide a gel that is clear or transparent and does not become cloudy upon the addition of colors and flavors.

Another object of this invention is to provide a gel that is dry to the touch.

Another object of this invention is to provide a gel that can be used as a hot pudding, as it gels at 150° Fahrenheit and can be served immediately.

Another object of this invention is the provision of a gel having the foregoing described characteristics that is reversible; that is, that may be reheated and remolded, and has the added advantage of remaining in molded form at atmospheric temperature.

Another object of this invention is to provide a gel having the foregoing characteristics that contain only pure vegetable extract of furcellaria, potassium chloride, potassium citrate and citric acid, which will remain clear or transparent and will have the requisite strength for being molded into and holding a predetermined shape, which can be flavored, colored and sweetened, which will be edible and palatable, and which can easily be handled by the housewife.

Another object of the invention is the provision of a novel, multiple element gel without gums or polymers, but with two (2) cation-containing salts, potassium chloride and potassium citrate, each in proportion of 20 percent by weight of the furcellaria. Each of these salts can vary in these mixtures from 10 percent to 25 percent of the weight of the furcellaria, depending on the strength desired. If the cation-containing salts are increased, the citric acid must be increased also to obtain clarity, transparency, elasticity and resiliency.

Another object of the invention is the proviseion of a novel four (4) element gel satisfactory for use by housewives, commercial gel makers and commercial bakers, which does not "bleed," "leak," or "fracture," which is not opaque or brittle and which is resilient.

The composition contemplated in this invention has ingredients which accomplish the foregoing objects and at the same time make a gel which can be eaten by all persons, whether strict vegetarians or not.

More specifically this invention pertains to the art of preparing clear or transparent and elastic gels, in powder form, for use by the general public. The gelling ingredient is derived from a gelling agent, furcellaria extract, (sold under the trade name "Uni-Loid Type 200" by Duche-Gum Corporttion, New York, N.Y.) which is capable of producing a gel of fine molding strength, without the use of any gums or polymers. The gelling agent is activated by an edible salt to produce gelation; i.e., furcellaria with cation-containing salts, potassium chloride and potassium citrate. Each salt comprises about 15.13 percent of the combined weight of said ingredients. Citric acid is added for clarity, transparency, elasticity and resiliency, and being 4.666 grams to 14.50 grams of the three (3) above-mentioned ingredients, which is a ratio of 1 gram citric acid to 3.11 grams of the furcellaria extract, potassium chloride and potassium citrate, and being 24.35 percent of the combined weight of said four (4) elements.

It has been found that citric acid must be added to the rest of the ingredients at a ratio of 4.666 grams to 14.50 grams of the furcellaria, potassium chloride and potassium citrate, to obtain absolute clarity, transparency, elasticity and resiliency; therefore, the acid is a critical element in the generic formula. Without citric acid at the aforementioned percentage, the gel will be an opaque mass. With the citric acid, at the already mentioned ratio, in the formula there is created a new, clear or transparent, very elastic, strong and resilient highly edible gel.

In this composition there is an ion exchange not yet fully understood, except that the shortening ions are sequestered and actually caused to lengthen and widen, or grow as it were, by the corrosive action of the citric acid on them, making them porous, thereby allowing light rays to pass through them, that makes the gel very clear or transparent, strong, yet elastic, and resilient, which takes colors and flavors without adulteration of the clearness, yet has excellent eating qualities. In order for the gel to be perfectly clear, the citric acid, at the already mentioned ratio, is essential.

The following examples show typical mixtures of dry powder ingredients for these gels; it is understood that this invention is not limited to any of these examples, as a slight variation of any of them can still give satisfactory results, as long as the minimum and maximum ranges are not violated, as the examples will show, to wit:

EXAMPLE 1

Common gel, employing only a gelose, i.e., furcellaria extract (unflavored, unsweetened and uncolored), where clarity, transparency, elasticity or resiliency is not essential.

|  | Grams |
|---|---|
| Furcellaria (refined), 60% | 8.70 |
| Potassium chloride, 20% | 2.90 |
| Potassium citrate, 20% | 2.90 |
| Total | 14.50 |

Note: All percentages are percentages of combined weight of total mixture.

Mix into 16 oz. (2 cups or 473.12 cc.) cold water (never use hot) and bring to a rolling boil, boil one-half minute. This gel is opaque, brittle and has little resiliency and elasticity.

Adding 4.666 grams of citric acid will make this gel clear, transparent, elastic and resilient, and will establish a flavor agent in case the gel is to be flavored, as Example 2 shows.

EXAMPLE 2

Generic gel (unflavored, unsweetened and uncolored).

|  | Grams |
|---|---|
| Furcellaria (refined), 45.39% | 8.70 |
| Potassium chloride, 15.13% | 2.90 |
| Potassium citrate, 15.13% | 2.90 |
| Citric acid (powdered), 24.35% | 4.666 |
| Total | 19.166 |

Note: All percentages are percentages of combined weight of total mixture.

This gel is very clear, transparent, elastic and resilient. Use water as in Example 1 above.

Example 2 is a new four (4) element gel wherein the citric acid is a critical element for absolute clarity which would appeal to the housewife from the standpoint of creating a beautiful, transparent gel-type dessert. It also makes the gel more elastic and resilient.

The resulting gels are non-bleeding, non-leaking, dry surfaced gels that leave no moisture on the fingertips after contact with the gel.

The following examples are specific formulas for dry dessert powders to be used as a gel-type dessert, pie fillings, or a hot pudding by the general public. The flavors and colors can be changed according to the dictates of each manufacturer's taste.

*These instructions are for manufacturers only.*—Mix liquid flavors and colors together, then mix with the cane sugar and mix in mixer 5 minutes. Remove from mixer and partially dry (to approximately 20 percent moisture). Mix the remaining dry ingredients (except citric acid) into the sugar, flavor and color base, and mix in mixer 5 minutes. Do not mix citric acid with wet or damp ingredients as the moisture starts a chemical reaction that is undesirable until gel is to be made. Take from mixer and dry thoroughly. Add citric acid powder and mix in mixer 15 minutes and powder is then ready for packaging. No preservatives are needed.

*The following instructions are for the consumer only.*—Stir dry powder into 16 oz. (2 cups) cold water, place on heat and bring to a rolling boil, boil one-half minute, stir occasionally to keep from excess foaming. Pour into molds or dessert cups and let stand at room temperature for 20 minutes (gel sets at room temperature in 15 minutes), chill and serve. To remove from molds or cups, dip in hot tap water for about 10 seconds, place mold or cup on serving dish, turn upside down and shake out gel, or turn mold or cup on its side, place fingertips at edge of gel and force gel down slightly and rotate one or two full turns, applying said pressure towards center, place on serving dish and shake out gel. To make fruit or vegetable salads, stir in fruit or vegetables as soon as gel is taken from heat, pour into molds or cups as gel sets at room temperature very rapidly.

EXAMPLE 3

*Orange flavor dessert powder*

| | | |
|---|---|---|
| Furcellaria (refined) | grams | 8.70 |
| Potassium chloride, 20% | do | 2.90 |
| Potassium citrate, 20% | do | 2.90 |
| Citric acid (powdered) | do | 4.666 |
| Cane sugar | do | 106.00 |
| Pure orange oil (ten fold) (Polak's Fruital Works) | drops [1] | 4.00 |
| Color, yellow (Schillings) | do | 14.00 |
| (Optional: Use orange or yellow color.) | | |

[1] Drops=1 cc.

Note: All flavors, colors and sweeteners are considered as extraneous material affecting only flavor, color and sweetness and are not considered part of the generic gel four (4) elements.

Directions are the same as for consumer's directions.

EXAMPLE 4

*Lemon flavor dessert powder*

| | | |
|---|---|---|
| Furcellaria (refined) | grams | 8.70 |
| Potassium chloride, 20% | do | 2.90 |
| Potassium citrate, 20% | do | 2.90 |
| Citric acid (powdered) | do | 4.666 |
| Cane sugar | do | 106.00 |
| Pure lemon oil (ten fold) (Polak's Fruital Works) | drops | 3.00 |
| Color, yellow (Schillings) | do | 4.00 |

Directions are the same as for consumer's directions.

EXAMPLE 5

*Lime flavor dessert powder*

| | | |
|---|---|---|
| Furcellaria (refined) | grams | 8.70 |
| Potassium chloride, 20% | do | 2.90 |
| Potassium citrate, 30% | do | 2.90 |
| Citric acid (powdered) | do | 4.666 |
| Cane sugar | do | 106.00 |
| Pure lime oil (five fold) (Polak's Fruital Works) | drops | 2.00 |
| Color (Schillings): | | |
| Yellow | do | 4.00 |
| Green | do | 2.00 |

Directions are the same as for consumer's directions.

EXAMPLE 6

*Blackberry flavor dessert powder*

| | | |
|---|---|---|
| Furcellaria (refined) | grams | 8.70 |
| Potassium chloride, 20% | do | 2.90 |
| Potassium citrate, 20% | do | 2.90 |
| Citric acid (powdered) | do | 4.666 |
| Cane sugar | do | 106.00 |
| Flavors (Polak's Fruital Works): | | |
| Blackberry WONF (New No. 19) | drops | 28.00 |
| Blackberry 4X concentrate | do | 18.00 |
| Colors (Schillings): | | |
| Red | do | 12.00 |
| Blue | do | 1.00 |

Directions are the same as for consumer's directions.

EXAMPLE 7

*Blackcherry flavor dessert powder*

| | | |
|---|---|---|
| Furcellaria (refined) | grams | 8.70 |
| Potassium chloride, 20% | do | 2.90 |
| Potassium citrate, 20% | do | 2.90 |
| Citric acid (powdered) | do | 4.666 |
| Cane sugar | do | 106.00 |
| Flavors: | | |
| Blackcherry WONF (No. 814 Sweet) (Polak's Fruital Works) | drops | 30.00 |
| Felcofix Cherry (Imitation) (Felton Chemical Works) | gram | .166 |
| Colors (Schillings): | | |
| Red | drops | 12.00 |
| Blue | do | 1.00 |

Directions are the same as for consumer's directions.

EXAMPLE 8

*Blackraspberry flavor dessert powder*

| | | |
|---|---|---|
| Furcellaria (refined) | grams | 8.70 |
| Potassium chloride, 20% | do | 2.90 |
| Potassium citrate, 20% | do | 2.90 |
| Citric acid (powdered) | do | 4.666 |
| Cane sugar | do | 106.00 |
| Blackraspberry (No. 9555) (Polak's Fruital Works) | drops[1] | 44.00 |
| Colors (Schillings): | | |
| Red | do[1] | 12.00 |
| Blue | do[1] | 1.00 |

[1] Drops=1 cc.

Directions are the same as for consumer's directions.

EXAMPLE 9

*Loganberry flavor dessert powder*

| | | |
|---|---|---|
| Furcellaria (refined) | grams | 8.70 |
| Potassium chloride, 20% | do | 2.90 |
| Potassium citrate, 20% | do | 2.90 |
| Citric acid (powdered) | do | 4.666 |
| Cane sugar | do | 106.00 |
| Loganberry WONF (Polak's Fruital Works) | drops[1] | 66.00 |
| Colors (Schillings): | | |
| Red | do[1] | 12.00 |
| Blue | do[1] | 1.00 |

[1] Drops=3 cc.

Directions are the same as for consumer's directions.

EXAMPLE 10

*Apricot nectar dessert powder*

| | | |
|---|---|---|
| Furcellaria (refined) | grams | 8.70 |
| Potassium chloride, 20% | do | 2.90 |
| Potassium citrate, 20% | do | 2.90 |
| Citric acid (powdered) | do | 4.666 |
| Cane sugar | do | 106.00 |
| Apricot (Special New) (Polak's Fruital Works) | drops | 32.00 |
| Colors (Schillings): | | |
| Red | do | 4.00 |
| Yellow | do | 1.00 |

Directions are the same as for consumer's directions.

EXAMPLE 11

*Pineapple flavor dessert powder*

| | | |
|---|---|---|
| Furcellaria (refined) | grams | 8.70 |
| Potassium chloride, 20% | do | 2.90 |
| Potassium citrate, 20% | do | 2.90 |
| Citric acid (powdered) | do | 4.666 |
| Cane sugar | do | 106.00 |
| Flavors (Polak's Fruital Works): | | |
| Pineapple WONF | drops[1] | 22.00 |
| Pineapple Flav-O-Lok | gram | .40 |
| Color, Yellow (Schillings) | drops[1] | 4.00 |

[1] Drops=1 cc.

Directions are the same as for consumer's directions.

EXAMPLE 12

*Plain gel for wine salad, chicken salad, fish salad or fruit salad*

| | Grams |
|---|---|
| Furcellaria (refined) | 8.70 |
| Potassium chloride, 20% | 2.90 |
| Potassium citrate, 20% | 2.90 |
| Citric acid (powdered) | 4.666 |
| Cane sugar | 106.00 |

Use wine of one's choice or canned fruit juice in place of water, or use broth of chicken for chicken salad. The sugar or sweetener can be eliminated where sweetness is undesirable (in chicken or fish salads).

Directions are the same as for consumer's directions.

It is readily apparent that flavors and colors other than those given above may also be used.

This gel takes colors and flavors not possible with commercially available gels due to their being opaque or to their breaking down when fresh pineapple or fortoric acid is added. In place of cane sugar, sweetening may be in the form of substances such as are sold under the trade names of "Table Sweet," "Sucaryl," calcium cyclamates, saccharin calcium or sodium cyclamates, and the like. This is an advantage to diabetics.

The examples create powders for gels of interest to the general public as dry dessert powders containing a 100 percent vegetable gelose and edible salts that can be used by the vegetarian as well as non-vegetarian for gel-type desserts and gelled salads, fruit or vegetable.

This gel is also excellent for pie fillings. For example, the cooked fruit can be placed in a pre-cooked pie shell, the pre-selected flavored mix can be cooked with the necessary amount of water, part or all of which can be replaced by the fruit or berry juice, it can then be poured over the fruit or berries and stirred until the fruit or berries are evenly distributed. Cool and serve.

Fresh fruits or berries may be added with any corresponding flavored gel.

I claim:

1. A transparent gel composition comprising the following ingredients in approximate percentages:

| | Percent |
|---|---|
| Furcellaria extract | 45.39 |
| Potassium chloride | 15.13 |
| Potassium citrate | 15.13 |
| Citric acid | 24.35 | the approximate percentage of each ingredient being based on the combined weight of the composition.

References Cited

UNITED STATES PATENTS

| | | | |
|---|---|---|---|
| 2,669,519 | 2/1954 | Baker | 99—131 |
| 2,864,706 | 12/1958 | Stoloff | 99—131 |

OTHER REFERENCES

Whistler et al.: Industrial Gums, Academic Press, New York, 1959, pp. 51–54 and 155–160.

RAYMOND N. JONES, *Primary Examiner.*

H. H. KLARE, *Assistant Examiner.*